(12) United States Patent
Morein

(10) Patent No.: US 6,353,874 B1
(45) Date of Patent: Mar. 5, 2002

(54) METHOD AND APPARATUS FOR CONTROLLING AND CACHING MEMORY READ OPERATIONS IN A PROCESSING SYSTEM

(75) Inventor: Stephen L. Morein, Cambridge, MA (US)

(73) Assignee: ATI International Srl, Barbados (KN)

( * ) Notice: Subject to any disclaimer, the term of this patent is extended or adjusted under 35 U.S.C. 154(b) by 0 days.

(21) Appl. No.: 09/527,753

(22) Filed: Mar. 17, 2000

(51) Int. Cl.[7] .......................... G06F 12/00; G06F 12/12
(52) U.S. Cl. ...................... 711/118; 711/134; 711/109; 711/100; 711/219; 711/132; 711/144
(58) Field of Search ................................. 711/132, 134, 711/109, 100, 219, 3, 118, 144, 145

(56) References Cited

U.S. PATENT DOCUMENTS

| | | | | |
|---|---|---|---|---|
| 5,155,825 A | * | 10/1992 | Moughanni et al. | ........ 711/207 |
| 5,502,833 A | * | 3/1996 | Byrn et al. | ................. 711/132 |
| 6,072,741 A | * | 6/2000 | Taylor | ........................ 365/219 |
| 6,148,376 A | * | 11/2000 | Claassen | ..................... 711/132 |
| 6,151,661 A | * | 11/2000 | Adams, III et al. | ......... 711/132 |
| 6,266,686 B1 | * | 7/2001 | Bistry et al. | ................ 708/204 |
| 6,275,903 B1 | * | 8/2001 | Koppala et al. | ............ 711/132 |
| 6,289,418 B1 | * | 9/2001 | Koppala | ..................... 711/132 |

* cited by examiner

*Primary Examiner*—Hong Kim
(74) *Attorney, Agent, or Firm*—Vedder, Price, Kaufman & Kammholz

(57) ABSTRACT

A method and apparatus for controlling and caching memory read operations is presented. A memory structure is used to store data for read operations in a manner that allows the data to be reused in order to respond to similar subsequent memory accesses. Circuitry is included that determines if data corresponding to read requests is currently buffered in the memory structure. If it is, no additional memory accesses over a bus are required to respond to the read request. If the data is not currently buffered, a read request is issued over the bus, and when the data is returned in response to the read request, it is placed in the memory structure for responding to the read request and possibly for responding to additional subsequent read requests.

21 Claims, 9 Drawing Sheets

METHOD AND APPARATUS FOR CONTROLLING AND CACHING MEMORY READ OPERATIONS IN A PROCESSING SYSTEM

FIELD OF THE INVENTION

The invention relates generally to memory accesses and more particularly to a method and apparatus for controlling and caching memory read operations.

BACKGROUND OF THE INVENTION

As computing systems continue to evolve, numerous processing entities involved in a computing system may interact with numerous data storage devices. Thus, a particular memory client may require data from a plurality of different data storage devices included in the processing system. Typically, a bus structure interconnects the various memory clients and memory devices, or other data storage devices, where the bus structure provides the conduit for carrying control information and data between the data storage devices and the memory clients.

In operation, the client issues memory requests for all of the storage devices via the bus, where each of the data storage devices may require a different amount of time to respond to requests directed to that data storage device. For example, local memory may provide a rapid response time, whereas a read request that is forwarded through an accelerated graphics port (AGP) bus interface to a storage entity residing on the AGP bus may take a significantly larger amount of time. Most memory clients are designed such that it is desirable to have the responses to the memory requests provided to the client in the order in which the memory requests were initially issued.

In order to ensure that the ordering of the responses to the read requests issued by the client are provided in the proper order, some prior art systems employ circular buffers that include a read and write pointers. The write pointer is used to store incoming data generated in response to the memory read requests, whereas the read pointer is used to access the circular buffer to retrieve the data to be provided to the client. Flags are included in the circular buffer that indicate validity of the data at various locations within the circular buffer. When the read pointer detects that the segment of data corresponding to a memory read operation is valid, it retrieves this data from the circular buffer and provides it to the client. The write pointer is used in association with the read requests received to generate storage addresses in the circular buffer that are used to store the results of the read operations. By buffering data retrieved for read operations in the circular buffer, the ordering of the responses to the various read requests can be properly ordered.

In many cases, there is some coherency within a series of read requests. For example, the same data fetched during one request may be fetched again in the near future. Similarly, the minimum amount of data that is retrieved from memory may be a block of data where the client only requires a small portion of the block for each read request. However, subsequent requests by that client may correspond to additional portions of the larger block of data originally fetched. Prior art systems that ensure memory read response ordering did not provide any means for taking advantage of such coherency in read requests.

Therefore, a need exists for a method and apparatus for controlling memory read operations that provide a level of caching such that coherency within a series of read requests can be exploited to improve overall system efficiency.

DETAILED DESCRIPTION OF A PREFERRED EMBODIMENTS OF THE INVENTION

Figure 1:
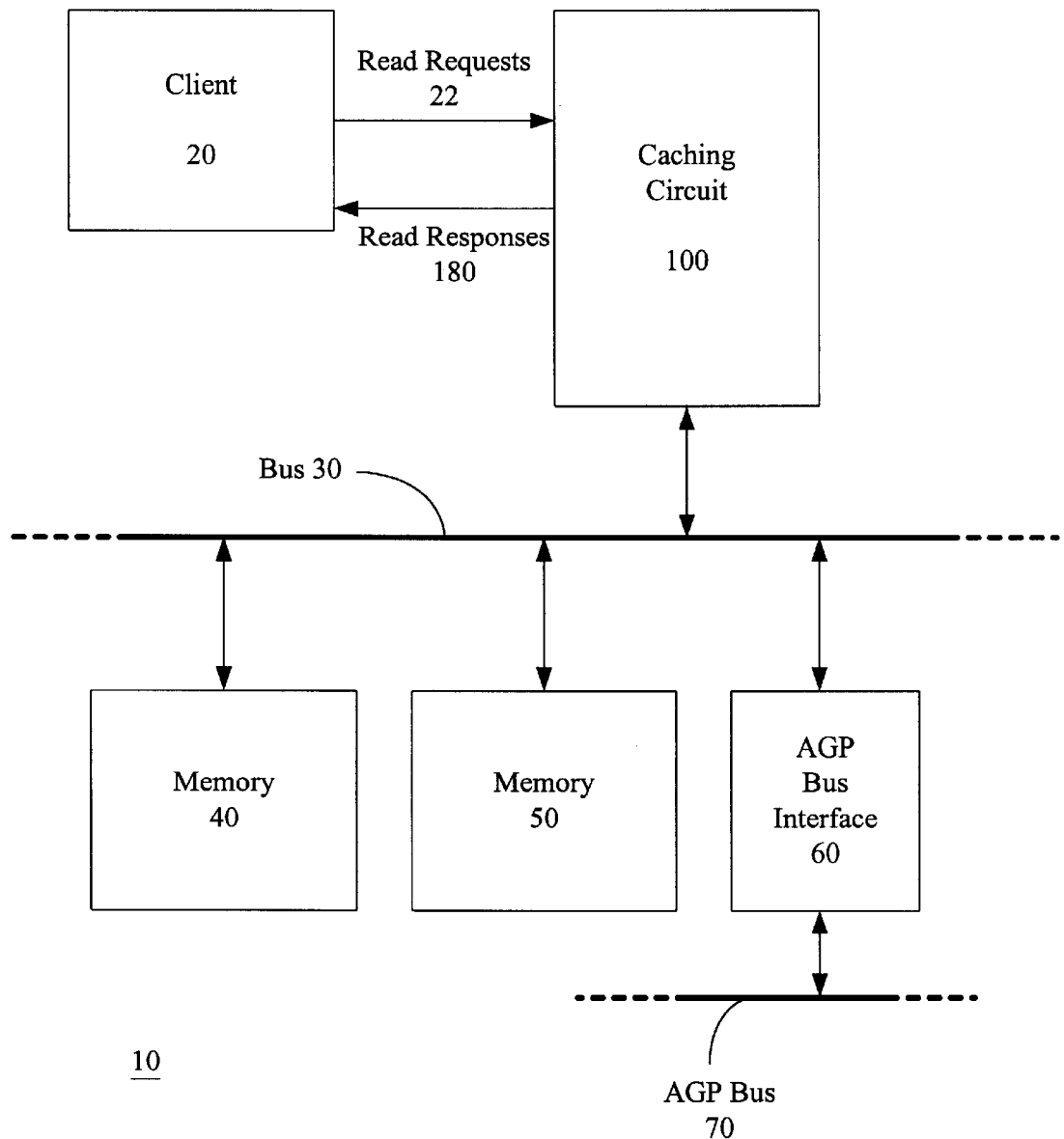
FIG. 1 illustrates a block diagram of a processing system in accordance with a particular embodiment of the present invention.

Generally, the present invention provides a method and apparatus for controlling and caching memory read operations. A client issues memory requests to a caching circuit, where the caching circuit is coupled to a memory bus that provides access to the addressing space of the computing system. The addressing space may include local memory and other circuits accessible over other bus structures such that the response times to the memory requests will vary. Within the caching circuit, a read controller receives each read request, which includes an address. The read controller checks a cache tag buffer to determine if the data corresponding to that address is currently stored within the caching circuit at an accessible location. If the address for the read request corresponds to one of the tags stored in the cache tag buffer, the read controller stores a cache hit indication into a cache address buffer. The cache hit indication includes information that allows the data to be located within a cache memory included in the caching circuit. If the address for the read requests does not match any of the tags currently stored in the cache tag buffer, the read controller issues a memory read request via the bus that includes a cache identifier such that the data returned in response to the memory request is stored in the cache memory at a location corresponding to the cache identifier. Note that a finite number of locations are included in the cache memory, and the data retrieved when a cache miss occurs may displace data stored in the cache memory such that the displaced data will not be accessible in the future.

When valid data is stored in the cache memory, a flag associated with the location in which that valid data is stored is configured to indicate the presence of valid data. A cache access controller reads the cache hit and cache miss indications from the cache address buffer in order. If the current cache indication read from the cache address buffer is a cache hit indication, control information is provided to the cache memory such that data stored at the location corresponding to the cache hit indication is provided to the client. Thus, the information included in the cache hit indication that identifies where the data is located within the cache memory is used to retrieve that data and it is then provided to the client. If the current cache indication is a cache miss indication, the cache access controller must check the flag associated with the location in the cache memory within which the data will eventually be stored when the response to the memory request over the bus is received. If the flag indicates that valid data is present, control information is provided to the cache memory such that that data is provided to the client. If the flag indicates that valid data is not yet present, the cache access controller waits until the flag indicates the presence of valid data before proceeding to retrieve the data and move on to the next cache indication in the cache address buffer.

As such, the responses to various read requests can be buffered such that the responses are delivered to the client in the proper order. In addition, the cache memory that stores the responses to the read operations can be utilized to access the same data during subsequent read operations without requiring a memory request to go out over the bus. As such, the overall efficiency with which memory is accessed is improved. This is especially beneficial in systems where coherency exists amongst a series of read requests issued by the client.

The invention can be better understood with reference to FIGS. 1–13. FIG. 1 illustrates a block diagram of a processing circuit 10 that includes a client 20, caching circuit 100, memories 40 and 50, and an AGP bus interface 60. The client 20 provides a plurality of read requests 22 to the caching circuit 100. The caching circuit 100 interacts with the bus 30 to execute the read requests and generate the read responses 180 that include the data desired by the client 20.

The response times associated with the various data storage structures coupled to the bus 30 may vary significantly. For example, the memory 40 may be local memory that provides a vary rapid response time such that little latency is experienced for memory read operations directed to the memory 40. Memory read operations directed toward the memory 50 may have a slower response time such that additional latency is encountered for each read operation to the memory 50. Memory requests directed to the AGP bus interface 60, which provides access to the AGP bus 70 and data storage devices coupled to the AGP bus 70, may incur the largest amount of latency. As such, the caching circuit 100 must provide buffering capabilities such that the various latencies can be accommodated in a manner that allows the read responses 180 to be provided to the client 20 in an order that matches the ordering of receipt of the read requests 22.

Figure 2:
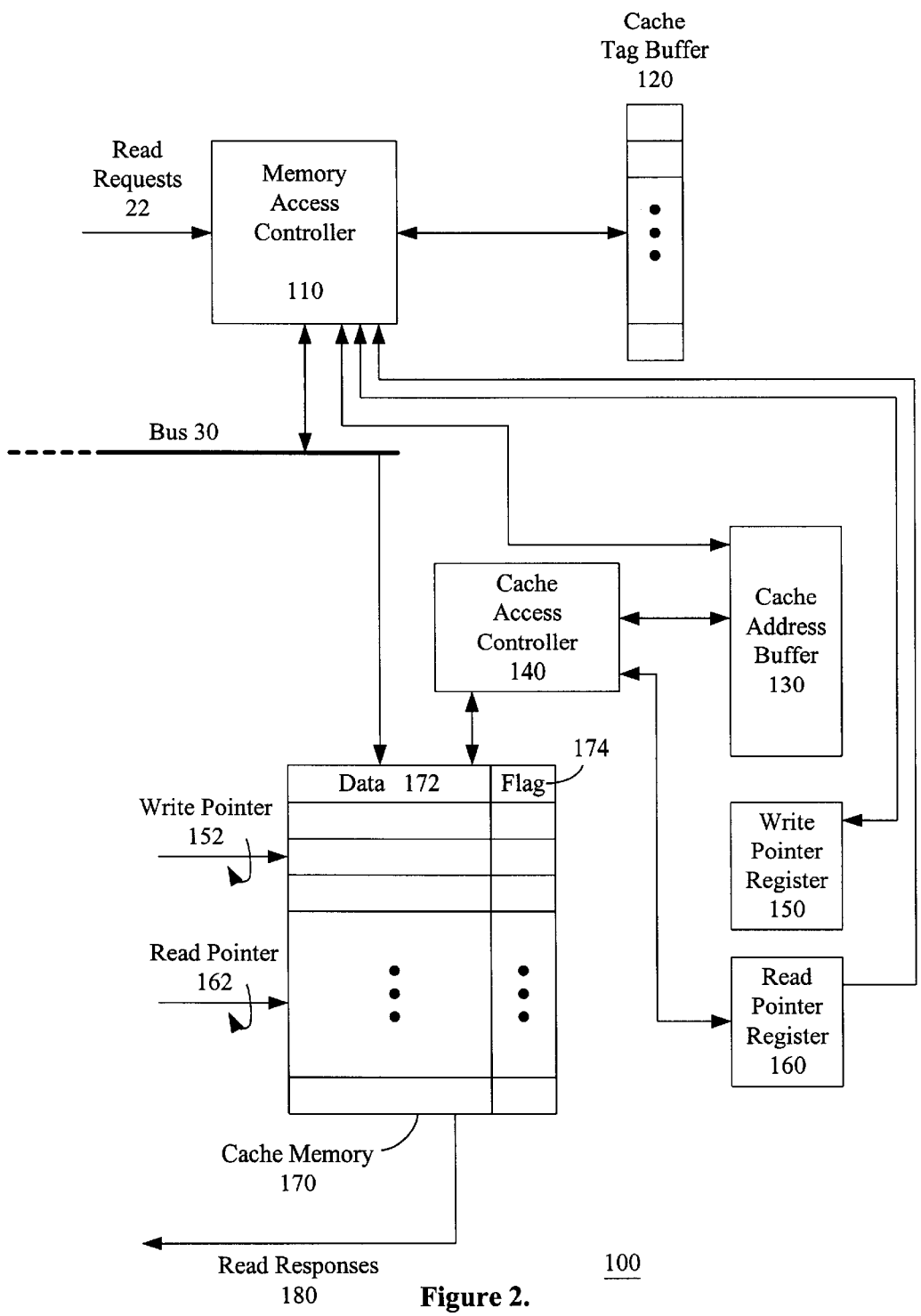
FIG. 2 illustrates a block diagram of a caching circuit in accordance with a particular embodiment of the present invention.

FIG. 2 illustrates a block diagram of a caching circuit 100 in accordance with a particular embodiment of the invention. The caching circuit 100 includes a memory access controller 110, a cache tag buffer 120, a cache access controller 140, a cache address buffer 130, a write pointer register 150, a read pointer register 160, and a cache memory 170. The caching circuit 100 may be implemented as part of an integrated circuit that may be a video graphics integrated circuit for use in a personal computer. In video graphics applications, the read requests 22 may correspond to texture data, Z data representing three-dimensional depth coordinates, or other data associated with video graphics processing. Such data is often retrieved in groups with a significant level of coherency such that the benefits of the invention described herein are particularly valuable.

The memory access controller 110 is operably coupled to receive the read requests 22 from the client 20 and is also coupled to the bus 30 such that memory requests can be issued via the bus 30 to one or more data storage devices. The memory access controller 110 is also operably coupled to the cache tag buffer 120, the read and write pointer registers 150 and 160, and the cache address buffer 130.

Each read request received by the memory access controller 110 from the client 20 includes an address. The address corresponds to the addressing space of the processing system 10, and may correspond to any one of the data storage devices accessible via the bus 30. When the memory access controller 110 receives a read request, it compares the address for that read request with the current set of tags stored in the cache tag buffer 120. If a match is determined between the address and a tag stored in the cache tag buffer 120, this indicates that the data being requested via the read request is already present within the cache memory 170 of the caching circuit 100. If none of the tags in the cache tag buffer 120 match the address corresponding to the read request, the data for that read request is not currently stored in the cache memory 170 (at least not in an accessible location), and it must be retrieved from the appropriate data storage device via the bus 30.

Regardless as to whether or not a match is determined between the address and the tags in the cache tag buffer 120, the memory access controller 110 stores an indication corresponding to the read request in the cache address buffer 130. In the case where there is a match between the address and a tag, a cache hit indication is stored in the cache address buffer 130. In the case where no match exists between the address and the tags, a cache miss indication is stored in the cache address buffer 130.

The cache access controller 140 utilizes the cache hit and cache miss indications stored in the cache address buffer 130 to determine the location of the data in the cache memory 170 corresponding to each read request. The cache memory 170 serves as a buffer for the data corresponding to the read requests such that the read responses 180 issued in response to the read requests 22 are ordered in the same order as the read requests were received. The cache memory 170 provides the added benefit of maintaining data for a limited time period after its initial use as a response to a read request. During this time period, the data can be used as a response to other read requests. Thus, if a subsequent read request corresponds to some of the data still accessible within the cache memory 170 that had in fact been placed there in order to generate a response to a previous read request, that data can be utilized once again without the need for a memory request to go out over the bus 30. This added efficiency is highlighted in the example detailed in FIGS. 3–11.

In order to determine where to place data retrieved via the bus 30 in the cache memory 170, a write pointer 152, which is stored in a write pointer register 150, is utilized. The write pointer preferably is used to point to the next free location within the cache memory 170. The cache memory 170 may be implemented as a standard cache structure, or more preferably, may be implemented as a circular buffer. In the case where the cache memory 170 is a circular buffer, the same locations within the cache memory 170 will be used repeatedly in a cyclical manner such that older data is eventually overwritten.

Incrementing the read and write pointers 162 and 152 in an embodiment in which the cache memory 170 is a circular buffer includes incrementing these pointers in a circular manner. Thus, the pointers will repeatedly progress through a sequence of addresses associated with the entries of the cache memory 170 such that when the end of the cache memory 170 is reached by a pointer, and the pointer is incremented, the pointer is modified to point to the beginning entry of the cache memory 170.

The cache memory 170 includes a plurality of entries. As is illustrated for the first entry in the cache memory 170, each entry includes a data portion 172 and a flag 174. The flag indicates whether or not the data portion for that entry is currently valid. As is apparent to one of ordinary skill in the art, the flag may be implemented as a single bit, where one state of the bit indicates valid data and the other state indicates invalid data. For purposes of discussion, a set flag, which may indicate a logic value one, is associated with valid data, whereas a cleared flag is associated with invalid data.

When the memory access controller 110 receives a read request that corresponds to data that is not accessible in the cache memory 170, it issues a memory request via the bus 30. The memory request includes a cache identifier that is based on the write pointer 152 such that data returned in response to the memory request is stored in the cache memory 170 at a location corresponding to the cache identifier. When the data is stored in the cache memory as cache data at the location corresponding to the cache identifier, the flag associated with a cache entry at that location is set to indicate valid data. After each memory request is issued by the memory access controller 110, the memory access controller 110 increments the write pointer register 150 such that the write pointer points to the next entry within the cache memory 170. This prevents data retrieved in response to a subsequent memory request from overwriting previously retrieved data prematurely. Note that the data present in the cache memory 170 changes with each cache miss that results in new data being fetched over the bus 30. The new data replaces older data in the cache, rendering the older data unusable in the future.

Because the cache tag buffer 120 stores tags corresponding to accessible data within the cache memory 170, the issuance of a memory request to the bus 30 which will result in new data being present in the cache memory 170 requires that the cache tag buffer 120 also be updated. Thus, the address corresponding to the read request that generated the memory request on the bus 30 or, or at least a portion of the address, is stored in the cache tag buffer 120 as a new tag. Preferably, the cache tag buffer 120 is implemented as a first in first out (FIFO) buffer such that when a new tag is stored in the cache tag buffer 120, an old tag is replaced. By implementing the cache tag buffer 120 as a FIFO, the oldest tag in the cache tag buffer 120 will be replaced. This oldest tag corresponds to cached data stored in the cache memory 170 that can no longer be used to provide responses to subsequently received read requests.

The ordering of the tags in the cache tag buffer 120 may also be used to generate the cache hit indications which are stored by the memory access controller 110 in the cache address buffer 130 when appropriate. The position of a tag within the cache tag buffer 120 may be directly related to the position of data within the cache memory 170. In one embodiment, a cache hit indication stored in the cache address buffer 130 includes the specific address of the cache entry in the cache memory 170 that includes the data to be used to provide the read response to a particular read request to which the cache hit indication corresponds.

In other embodiments, a read pointer 162 is utilized to step through the cache memory 170 in a manner that tracks the write pointer 152. The read pointer 162 is stored in the read pointer register 160. The cache hit indications stored in the cache address buffer 130 may include an offset with respect to the read pointer 162 such that the precise location of the desired data in the cache memory 170 can be determined by combining the offset with the value of the read pointer 162. The use of such offsets will be more clearly understood following the explanation included with the example of FIGS. 3–11 below.

Thus, when the cache access controller 110 stores a cache hit or a cache miss indication in the cache address buffer 130, it is storing an indication as to where the data for a particular read request is to be found within the cache memory 170. The cache access controller 140 retrieves this indication and utilizes it to fetch the data from the cache memory 170 such that it is provided as a read response 180. By maintaining the ordering of the cache hit and cache miss indications within the cache address buffer 130, and ensuring that the cache access controller 140 steps through the various indications stored within the cache address buffer 130 in order, the read responses 180 generated for the read requests 22 will be provided in the same order as the read request 22 were received.

In order to ensure ordering of the read responses 180, the cache address buffer 130 is preferably implemented as a FIFO buffer. The cache access controller 140 fetches the current cache indication stored at the front of the queue (next entry out) stored in the cache address buffer 130, whereas new cache hit in this indications generated by the memory access controller 110 are stored at the back of the queue within the cache address buffer 130.

When the cache access controller 140 retrieves the current cache indication from the cache address buffer 130 it determines whether or not the current cache indication corresponds to a cache hit indication or a cache miss indication. If each entry in the cache address buffer 130 includes M bits, a value of 0 encoded by the M bits may indicate a cache miss indication, whereas any other value corresponds to an offset value. Each offset value thus corresponds to a cache hit indication where the location of the data in the cache memory 170 can be computed using the read pointer 162 and the offset included in the cache hit indication.

The number of bits included in each entry within the cache address buffer 130 corresponds to the number of tags supported within the cache tag buffer 120, and also the maximum number of cached entries within the cache memory 170 that are accessible at any one time. For example, if each entry in the cache address buffer 130 includes three bits, the cache tag buffer 120 can store seven tags, and seven entries in the cache memory 170 (in addition to that currently pointed to directly by the read pointer 162) will be accessible. This is because seven offsets can be encoded using the three bits, whereas the eighth encoding possible with three bits is used to indicate a cache miss indication. Additional clarity will be achieved through the discussion of the example illustrated in FIGS. 3–11 below.

When the cache access controller 140 receives a current cache indication from the cache address buffer 130 that corresponds to a cache miss indication, the cache access controller 140 utilizes the value of the read pointer 162 stored in the read pointer register 160 to access the cache memory 170. Thus, control information is provided to the cache memory 170 such that the cache data stored at the location corresponding to the read pointer is provided to the client as the read response 180. Note that before the cache access controller 140 can provide the control information to the cache memory, it must ensure that the data located at the entry corresponding to the read pointer 162 is valid. Thus, the cache access controller 140 first checks the flag associated with the entry selected by the read pointer 162 prior to reading the data from the entry. If the flag is not set, thus indicating that the data is currently invalid, the cache access controller 140 waits for the flag to be set indicating valid data. The read pointer register 160 is incremented following the processing of a cache miss indication by the cache access controller 140.

When the cache access controller 140 retrieves a current cache indication from the cache address buffer 130 that is a cache hit indication, the data to be provided as a response is already present and valid within the cache memory 170. As such, the cache access controller 140 generates the appropriate control information from the read pointer register 160 and the offset encoded in the cache hit indication. This control information is then provided to the cache memory 170 such that the cache data stored at the location corresponding to the cache hit indication is provided as the read response 180 to the client. The read pointer register 160 is not incremented following the processing of a cache hit indication by the cache access controller 140.

Because the cache memory 170 is limited in the amount of data it effectively caches and makes available for use in responding to subsequent read requests, the memory access controller 110 must ensure that the buffering capabilities are not over utilized in a manner that results in the loss of data. As such, the memory access controller may compare the read pointer 162 with the write pointer 152 to ensure that new data retrieved via the bus 30 is not written to a location that has not yet been fully utilized by the cache access controller 140 for retrieving data. The spacing between the write pointer 152 with respect to the read pointer 162 should be at least equal to the number of entries in the cache tag buffer 120. Thus, the maximum offset, which corresponds to the oldest entry in the cache tag buffer 120 at any one time, when used in conjunction with the read pointer 162 may generate an address to the cache memory 170 that corresponds to a location that is behind the read pointer 162 by a number of entries equal to the maximum offset value. As such, the write pointer 152 must never overwrite this location. If the write pointer 152 progresses through the cache memory 170 and begins to approach the read pointer 162 such that this margin, or buffered area, is endangered, the memory access controller 110 should signal that subsequent read requests (or at those that would result in a cache miss) cannot be processed until this condition is alleviated and the read pointer 162 progresses.

Thus, the memory access controller 110 can compare the value within the read pointer register 160 with the value in the write pointer register 150 to determine if there is space available in the cache memory 170 for storage of data generated in response to a memory request on the bus 30. If the comparison indicates that there is no space available, processing of subsequent read requests can be halted, or postponed. If space is available, the memory access controller can continue operating normally.

Initially, the read pointer 162, and the write pointer 152 are configured to point to the same entry within the cache memory 170. As no data is currently stored in the cache memory 170 in the initial state, the write pointer will gradually be incremented as memory requests are issued on the bus 30 by the memory access controller 110. The read pointer 162 will not advance until data has been returned in response to the memory requests and the cache access controller 140 causes that data to be provided as read responses 180. Thus, after the initial state, the read pointer 162 will always lag the write pointer 152. However, the write pointer 152 may progress through the circular buffer and effectively approach the point where it is going to "lap" the read pointer 162. The difference that must be maintained between the read pointer 162 and the write pointer 152 is a distance before the write pointer laps the read pointer 162. Thus, in the example given earlier where seven tags exist in the cache tag buffer 120 such that the maximum offset is seven, the write pointer 152 must always be at least eight entries short of lapping the read pointer 162.

In order to better illustrate the functionality and operation of the caching circuit illustrated in FIG. 2, portions of the caching circuit are illustrated in FIGS. 3–11 which correspond to subsequent time steps in an operational example of the caching circuit. The example illustrated in FIGS. 3–11 is greatly simplified in order to further the understanding of the operation of the circuitry.

Figure 3:
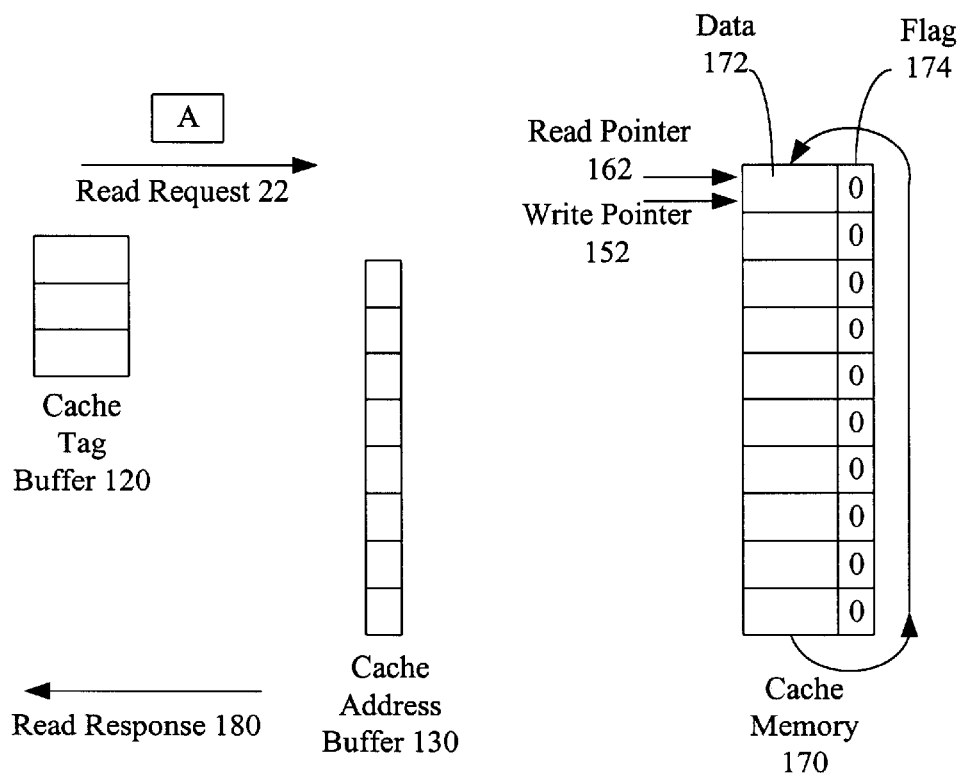
FIGS. 3–11 illustrate a graphical representation of a sequence of configurations of portions of the caching circuit 100 in accordance with an example embodiment of the present invention.

FIG. 3 illustrates the system in its initial state as the first read request 22 is being received. The portions illustrated in FIGS. 3–11 include the cache tag buffer 120, the cache address buffer 130, and the cache memory 170. As is illustrated, the cache tag buffer 120 only includes three entries. As such, the maximum offset that can exist with respect to retrieving data using the read pointer 162 is three. Therefore, the cache memory 170 is only effectively caching three sets of data for potential reuse.

In the initial state illustrated in FIG. 3, the first read request corresponds to a read request to location A. The cache tag buffer 120 is currently empty, and the read and write pointers 162 and 152 are both shown to point to the first entry of the cache memory 170. Because the cache memory 170 does not currently store any data that could be used to provide a response to the read request 22, a cache miss occurs. The modifications to the cache tag buffer 120, the cache address buffer 130, and the cache memory 170 as a result of the cache miss are illustrated in the subsequent time step shown in FIG. 4.

Figure 4:
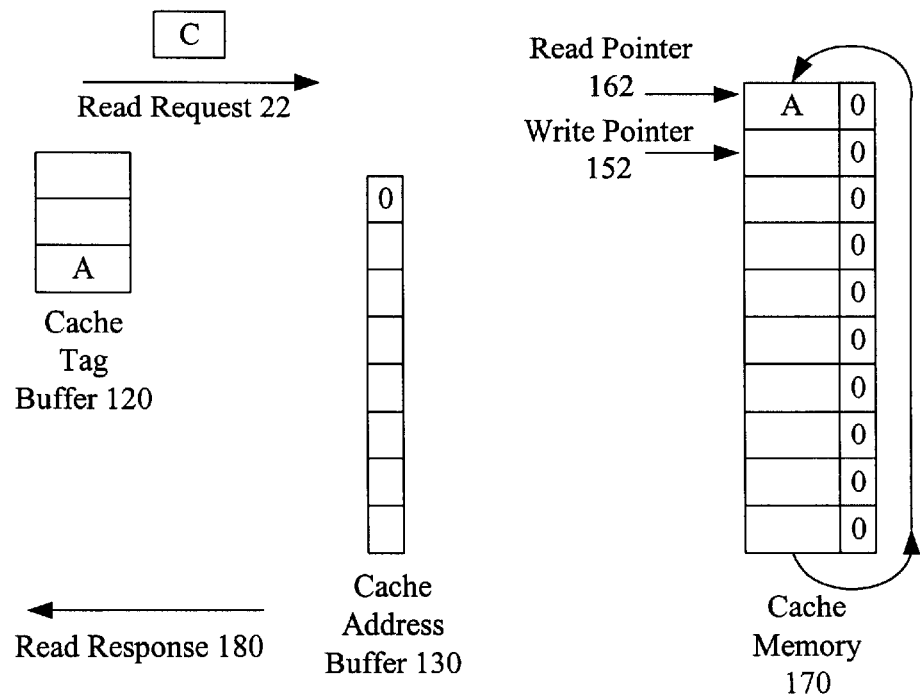

Because the read request 22 corresponding to address A resulted in a cache miss, a memory request utilizing the address A is issued on the memory bus. The write pointer 152 is utilized to generate a cache identifier that will ensure that the data provided in response to the memory request is stored in the first entry of the cache memory 170 as shown in FIG. 4. Note that the address A is shown in this first entry for clarity, however the flag 174 is cleared, thus indicating that no valid data is present in that entry. The address A, or a portion thereof, is stored in the cache tag buffer 120, thus indicating that any additional read requests corresponding to address A can be serviced without the need for generating another memory request. The cache address buffer 130 has been modified to include a cache miss indication, which is encoded with a value zero. Cache hit indications will be encoded with offset values of 1, 2, or 3.

During the time step illustrated in FIG. 4, the data corresponding to address A has not yet been stored in the cache memory 170, which is indicated by the cleared flag for that entry. As such, no data can be provided as a read response 180. However, it should be noted that a subsequent read request 22 corresponding to address C has been received. Comparing the address C with the tags stored in the cache tag buffer 120 indicates that a cache miss occurs once again. The resulting state of the various portions of the caching circuit during a subsequent time step are illustrated in FIG. 5.

Figure 5:
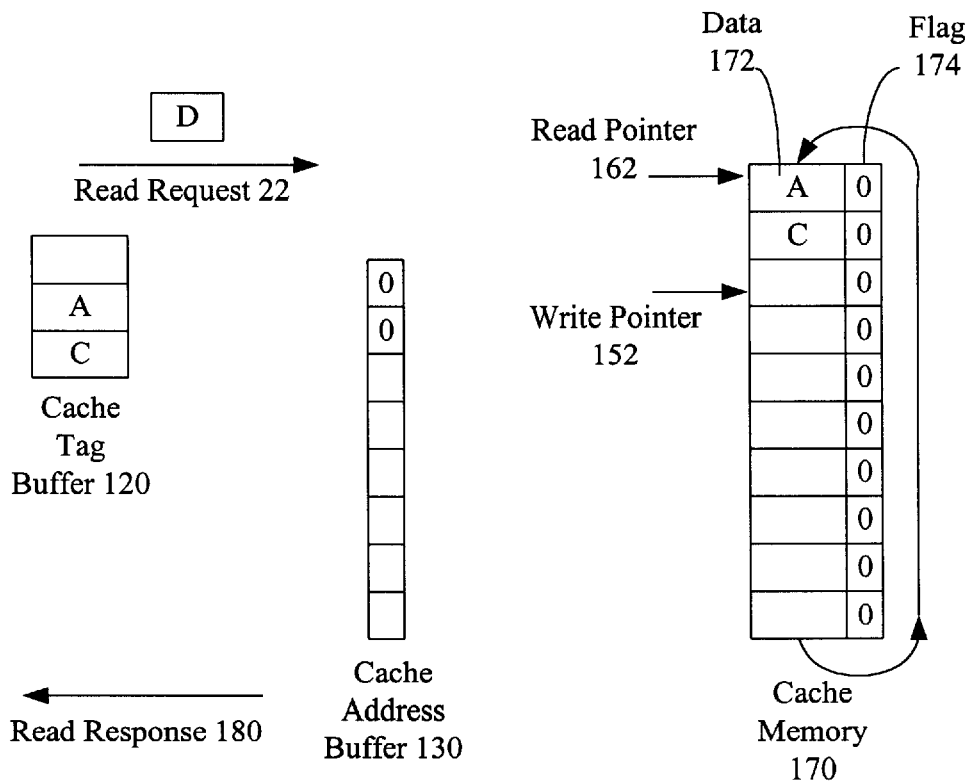

As is illustrated in FIG. 5, the cache miss resulting from the read request for address C has resulted in a tag corresponding to address C being added to the cache tag buffer 120. An additional cache miss indication has been included in the cache address buffer 130, and the write pointer 152 has been advanced to point to a subsequent entry within the cache memory 170. The flags within the cache memory 170 still indicate that no valid data has been retrieved for either address A or address C, and therefore no data can be provided as a read response 180. During the time interval illustrated in FIG. 5, a subsequent read request corresponding to address D is received.

Figure 6:
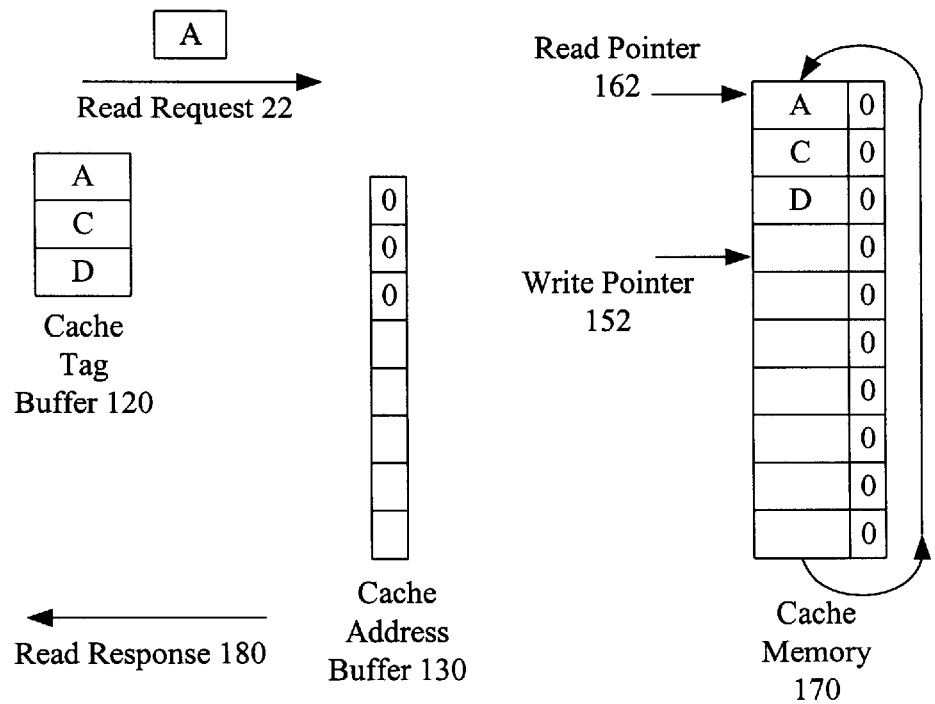

A subsequent time step to that illustrated in FIG. 5 is illustrated in FIG. 6. The read request for address D received during the time step of FIG. 5 resulted in another cache miss. As such, the cache tag buffer 120 has been modified to include a tag corresponding to address D. Another cache miss indication has been included in the cache address buffer 130, and the write pointer 152 has been advanced once again.

Note that the read request 22 received during the interval illustrated in FIG. 6 is for address A. The comparison of the address A with the tags stored in the cache tag buffer 120 will produce a cache hit indication, which indicates that the data corresponding to address A will be available in the cache memory 170 when the cache hit indication to be stored in the cache address buffer 130 is eventually processed. The modification to the various buffers as a result of the cache hit indication is illustrated in the subsequent time step shown in FIG. 7.

Figure 7:
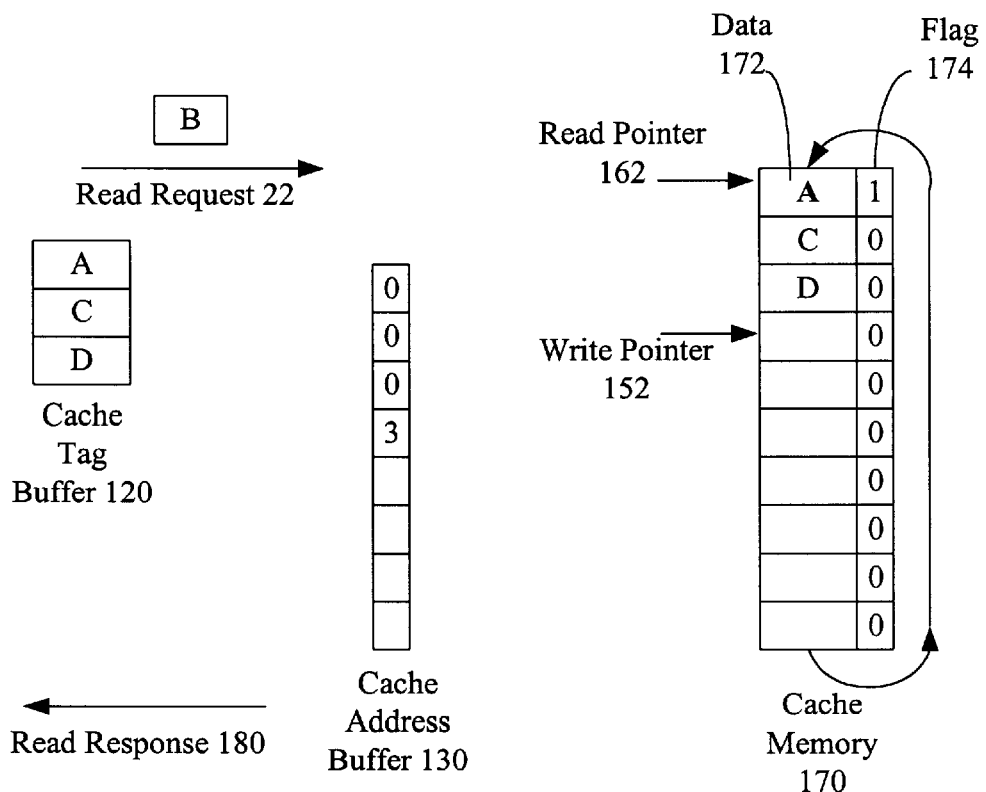

Because a cache hit occurred during the interval of FIG. 6, no new tags are added to the cache buffer 120 for the interval illustrated in FIG. 7. The cache address buffer 130 has been modified to include a cache hit indication, represented by the numeral 3, which corresponds to a cache hit having an offset value of three. The offset value of three is based on the position of the tag corresponding to the address A within the cache tag buffer 120. Because the tag corresponding to the address A has propagated to the top of the cache tag buffer 120, thus indicating it is the next tag to be replaced, the offset stored in the cache address buffer 130 is the maximum offset of three.

Note that the write pointer 152 was not advanced, as a cache hit indication was stored in the cache address buffer 130. The write pointer 152 need not be advanced because no new data will be stored in the cache memory 170 as a result of the previously received read request for address A. This is because the data required to respond to the read request for address A will already be stored within the cache memory 170, and therefore another entry need not be utilized.

Two additional developments are shown in the time interval illustrated in FIG. 7. A new read request corresponding to address B is received, and the flag associated with the entry within the cache memory 170 in which the data corresponding to address A is to be stored has been set. This indicates that the data corresponding to address A has been returned in response to the memory request, and the entry stores valid data corresponding to address A. As such, the cache access controller 140, which has been monitoring this flag begins to initiate the output of the data corresponding to address A as a read response 180. Because the cache address buffer 130 stores a cache miss indication in its first location, the cache access controller 140 will be monitoring the flag 174 associated with the first entry in the cache memory 170, as the first entry is the entry pointed to by the read pointer 162.

Figure 8:
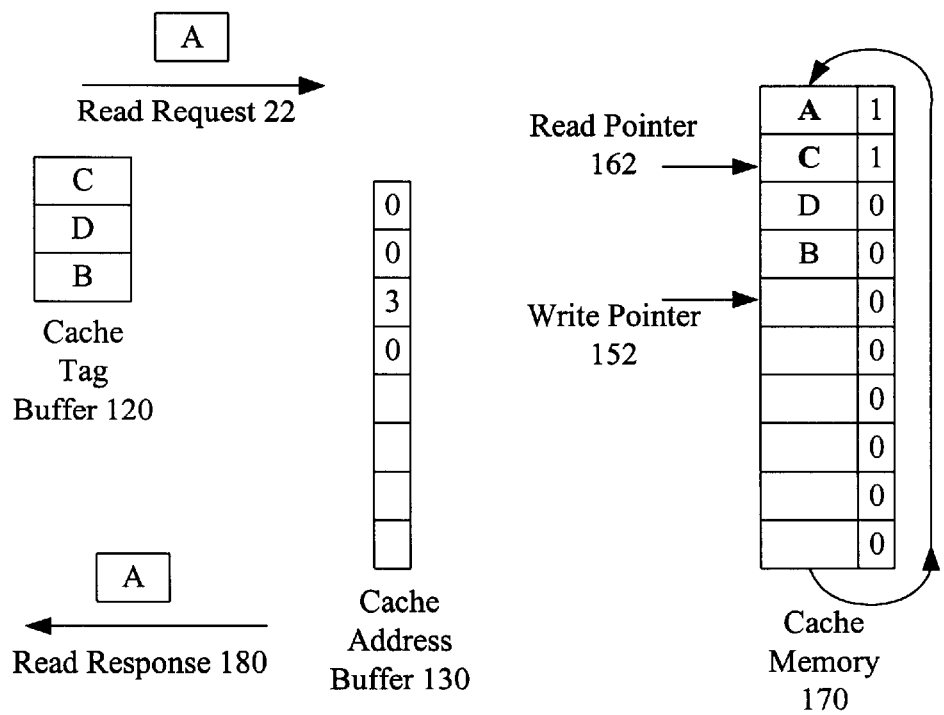

Once the cache access controller 140 detects that the flag 174 has been set, the cache access controller provides the control information to the cache memory 170 such that the data 172 stored in this entry is provided as a read response 180 during the time interval illustrated in FIG. 8. In conjunction with the provision of control information to the cache memory 170 such that the data 172 is provided as output, the read pointer 162 is incremented to point to the subsequent entry within the cache memory 170. In addition to this, the cache miss indication formerly stored in the cache address buffer 130 that resulted in the data output corresponding to address A is removed from the cache address buffer 130 (or a pointer to the current indication is advanced), and the remaining indications in the cache address buffer 130 propagate forward.

The read request received during the time interval of FIG. 7 resulted in a cache miss, as none of the tags in the cache tag buffer 120 matched the address B. As such, the interval illustrated in FIG. 8 shows a new cache tag corresponding to address B being inserted in the cache tag buffer 120, which results in the expulsion of the tag corresponding to address A that had been stored in the cache tag buffer 120 in the previous time interval. In addition, the cache miss which occurred during the time interval of FIG. 7 results in the incrementing of the write pointer 152 and the addition of another cache miss indication to the cache address buffer 130.

During the time interval shown in FIG. 8, the data corresponding to address C is stored in the cache memory 170, and the flag associated with that entry is set to indicate the presence of valid data. In addition, a new read request corresponding to address A is received. Note that the cache tag buffer 120 no longer stores a tag corresponding to address A (it was replaced by a tag for address B in the previous interval), and as such, a cache miss occurs. Although it appears that valid data corresponding to address A is still available within the cache memory 170, the maximum offset is three, and combining this maximum offset with the projected location of the read pointer 162 when the indication corresponding to the read request for address A which is to be stored in the cache address buffer 130 during this interval is to be processed reveals that the cache memory entry that is already present corresponding to address A will not be available. In other words, the read pointer 162 will point to the entry below that within which the data corresponding to address B will be stored when the read request received during the interval of FIG. 8 is serviced. Because the maximum offset is three, the data corresponding to address A stored in the first entry will not be reachable by combining the read pointer 162 with the maximum offset value, which is three.

Figure 9:
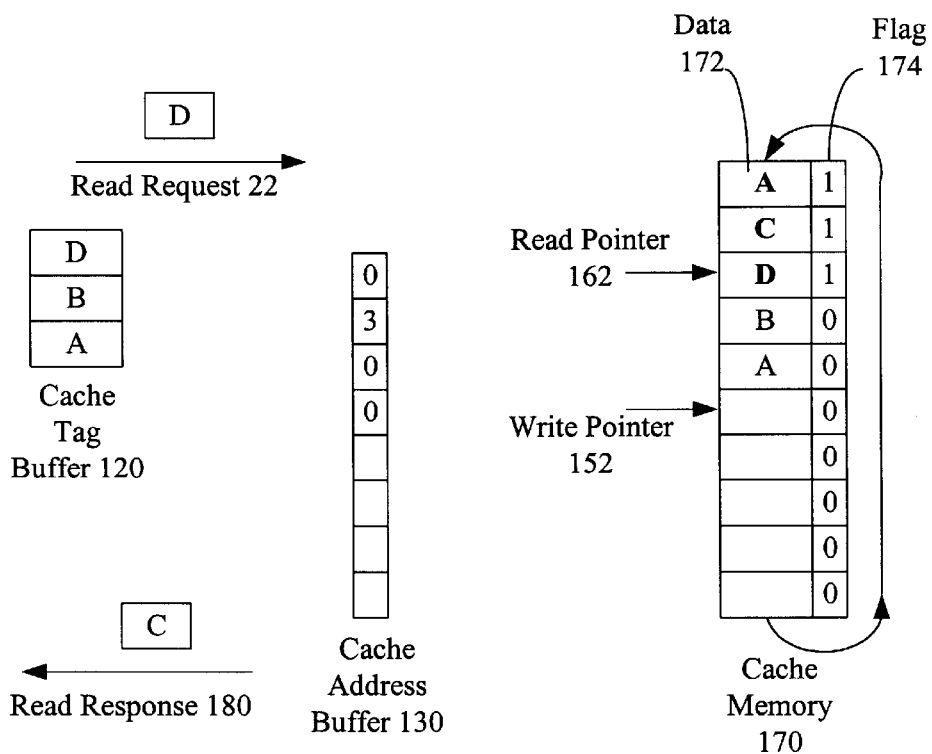

Progressing to the next time interval, which is illustrated in FIG. 9, the results of the cache miss which occurred during the interval of FIG. 8 can be observed. Because the data corresponding to address C had been stored within the cache memory 170 during the previous interval, the cache access controller 140 will detect the valid flag indication and provide the data corresponding to address C as a read response 180. This removes the cache miss indication from the top of the cache address buffer 130, thus allowing the remaining indicators within the cache address buffer to trickle upward. The cache miss which occurred during the previous interval results in a tag corresponding to address A being added to the cache tag buffer 120, thus displacing the tag corresponding to address C that had been included. The write pointer 152 has been advanced, as has the read pointer 162, based on the generation of the read response 180. Note that data corresponding to address D has also been received and therefore the valid bit corresponding to that entry within the cache memory 170 has been set. As is also indicated in the illustration of FIG. 9, a new read request corresponding to address D is being received. Based on the current state of the cache tag buffer 120, the read request corresponding to address D will result in a cache hit.

Figure 10:
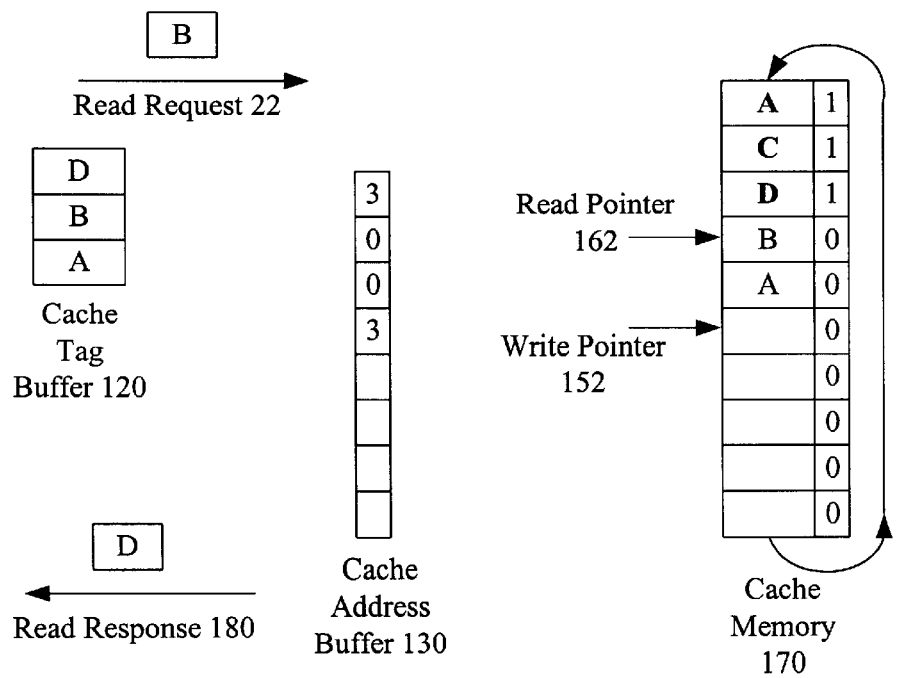

Moving to the subsequent time interval, which is illustrated in FIG. 10, the modifications due to the changes that occurred during the interval of FIG. 9 can be observed. The cache access controller 140 will cause the data corresponding to address D to be provided as a read response 180, thus resulting in the read pointer 162 being advanced. Note that the write pointer 152 has not also advanced because of the cache hit that occurred in the interval of FIG. 9. The cache hit results in a cache hit indication being added to the cache address buffer 130, where the cache hit indication has an offset value of three. The cache hit also results in the cache tag buffer 120 not being modified.

It should be noted that a cache hit indication has now propagated to the front of the cache address buffer 130. Because the cache access controller 140 will determine that this cache hit indication is at the front of the queue, the cache access controller 140 can immediately process this cache hit indication without having to determine whether or not the required data to respond to the indication is present in the cache memory 170. The read request received during the interval of FIG. 10 corresponds to the address B, which has a matching tag in the cache tag buffer 120. As such, another cache hit has occurred.

Figure 11:
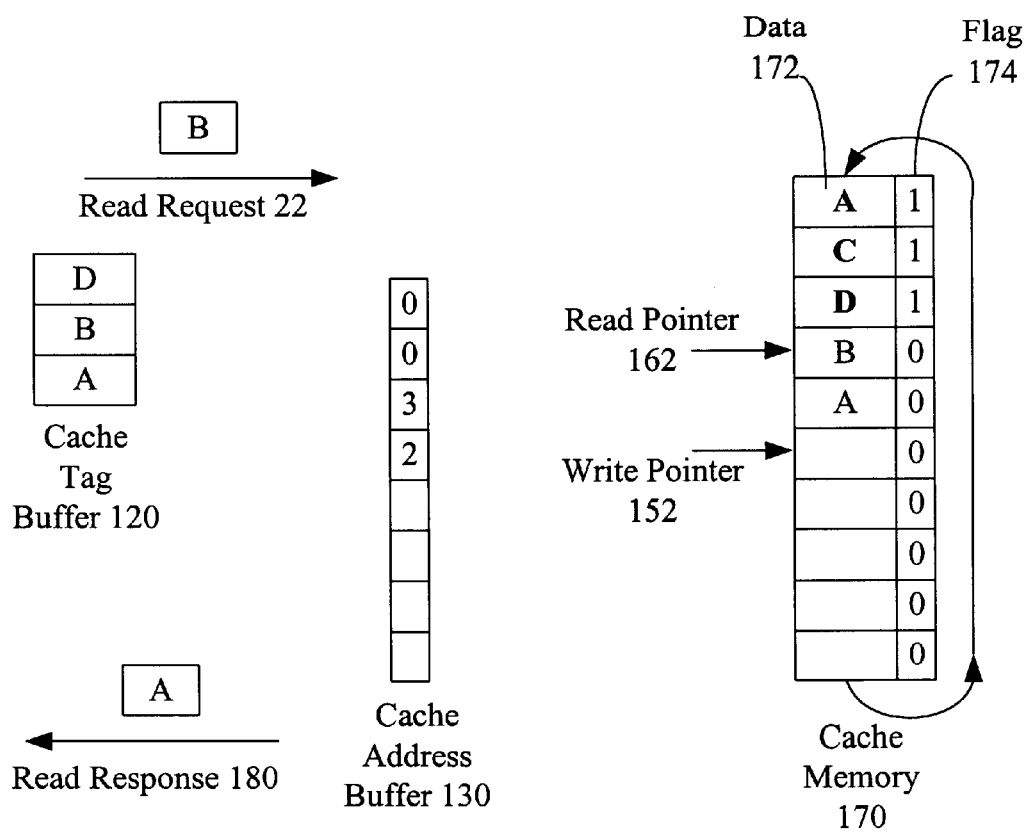

Proceeding to the subsequent interval, which is illustrated in FIG. 11, the immediate processing of the cache hit indication by the cache access controller 140 can be observed. The data stored in the cache memory 170 offset from the read pointer by a value of three, which is the data corresponding to address A, is retrieved from the cache memory 170 and provided as the read response 180. A new cache hit indication having an offset value of two has been added to the cache address buffer 130 to correspond to the cache hit for the address B that occurred during the previous interval. Note that the new read request being received during this interval also corresponds to the address B, and this will result in another cache hit indication having an offset value of two being added to the cache address buffer 130 during the subsequent interval, which is not illustrated. Because a cache hit indication occurred during the previous interval, the cache tag buffer 120 is unmodified. Similarly, the write pointer 152 has not been incremented. Because the cache access controller 140 processed a cache hit indication during the previous interval, the read pointer 162 is not incremented as well.

As can be seen through the example illustrated in FIGS. 3–11, in the case where numerous requests corresponding to a single address are received in close temporal proximity, data stored within the cache memory 170 can be reused to respond to more than one of the requests. It should be noted that the particular address received for the read request may be an address corresponding to a portion of a block which is retrieved for each memory request sent out over the bus. As such, each individual request may only result in a portion of a memory block stored in the cache memory 170 being provided as a read response 180. In such instances, the cache address buffer 130 may include an additional field that is used to select the portion of the block stored in the cache memory 170 which is provided as the read response 180. By caching blocks of data in the cache memory 170 and allowing those cached blocks to be reused, memory access efficiency can be increased while ensuring that the ordering of responses to read requests matches the ordering of the receipt of the read requests.

Figure 12:
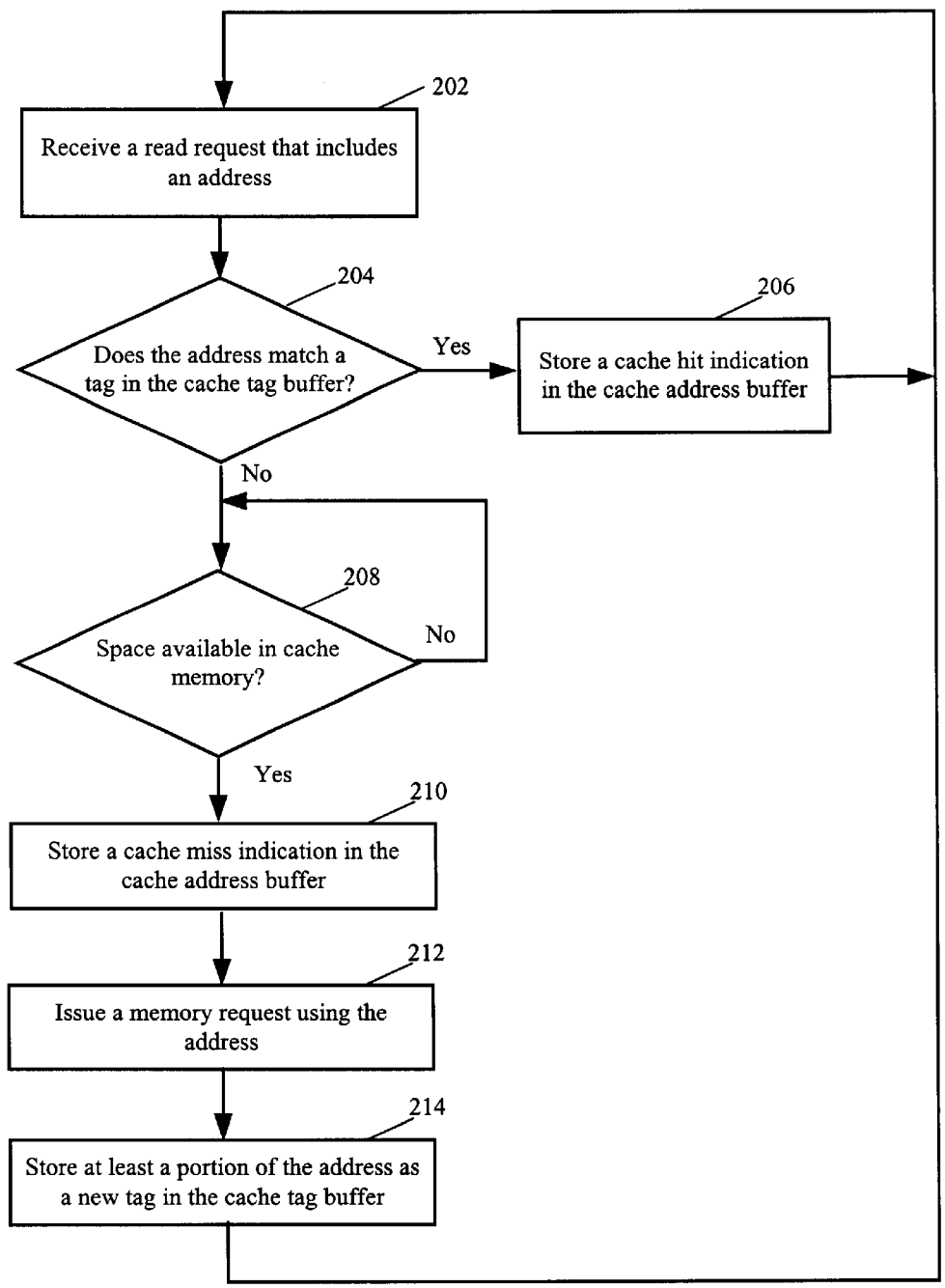
FIG. 12 illustrates a flow diagram of a method for queuing read requests received by a caching circuit in accordance with the present invention.

FIG. 12 illustrates a flow diagram of a portion of a method for controlling memory read operations, where the method illustrated in FIG. 8 may be performed by a block such as the memory access controller 110 illustrated in FIG. 2. The method begins at step 202 where a read request that includes an address is received. At step 204 it is determined if the address matches a tag stored in a cache tag buffer. The cache tag buffer preferably stores N tags corresponding to N addresses where N is an integer. If a match is determined at step 204, this indicates the data needed to respond to the read request is already present in a cache memory structure within the system. As such, the method proceeds to step 206 where a cache hit indication is stored in a cache address buffer. The cache hit indication preferably includes information required to locate the needed data in the cache memory within the system. Thus, when the cache hit indication is serviced by a cache access controller, the appropriate data can be fetched from the cache memory 170 for generation of the read response 180. Storing a cache hit indication at step 206 may include storing a cache hit indication that includes an offset, where the offset is used in combination with the read pointer to determine the location in the cache memory corresponding to the buffered cache hit indication such that data may be retrieved by the cache access controller. In other embodiments, storing a cache hit indication may include storing a cache hit indication that includes a cache memory address, where the cache memory address is used to directly access the cache memory to retrieve data.

When it is determined at step 204 that there is not a tag stored in the cache tag buffer that matches the address of the read request, the method proceeds to step 208 where it is determined whether or not there is space available in the cache memory. Preferably, the determination as to whether space is available in the cache memory is performed by comparing a read pointer and a write pointer. The comparison between the read and write pointers was described earlier, and should be performed in a manner to ensure that the write pointer does not effectively "lap" the read pointer, or approach the read pointer within a threshold proximity. The threshold proximity is preferably determined based on the number of tags that are included in the cache tag buffer. If the write pointer reaches the threshold proximity with respect to the read pointer, processing of subsequent read requests that require memory requests may be stalled.

Once it is determined that there is space available in the cache memory at step 208, the method proceeds to step 210 where a cache miss indication is stored in the cache address buffer. The method then proceeds to step 212 where a memory request is issued via the bus using the address corresponding to the read request. The memory request issued on the bus may result in data being returned in response from one of a number of potential data storage devices. When data is returned it is stored in the cache memory at a location corresponding to a cache identifier that is included in the memory request. Preferably, the cache identifier is generated based on a write pointer that indicates the next free location within the cache memory. Once data is stored in the cache memory as a result of a memory operation, a flag associated with the location within which the new data has been stored is configured to indicate the presence of valid data.

At step 214, at least a portion of the address is stored as a new tag in the cache tag buffer. Storage of a new tag in the cache tag buffer replaces an old tag in the buffer, and preferably the cache tag buffer is structured as a FIFO buffer such that the oldest tag included in the cache tag buffer is the tag that is removed from the cache tag buffer. Following the completion of steps 214 and 206, the method returns to step 202 where it waits for a subsequent read request.

Figure 13:
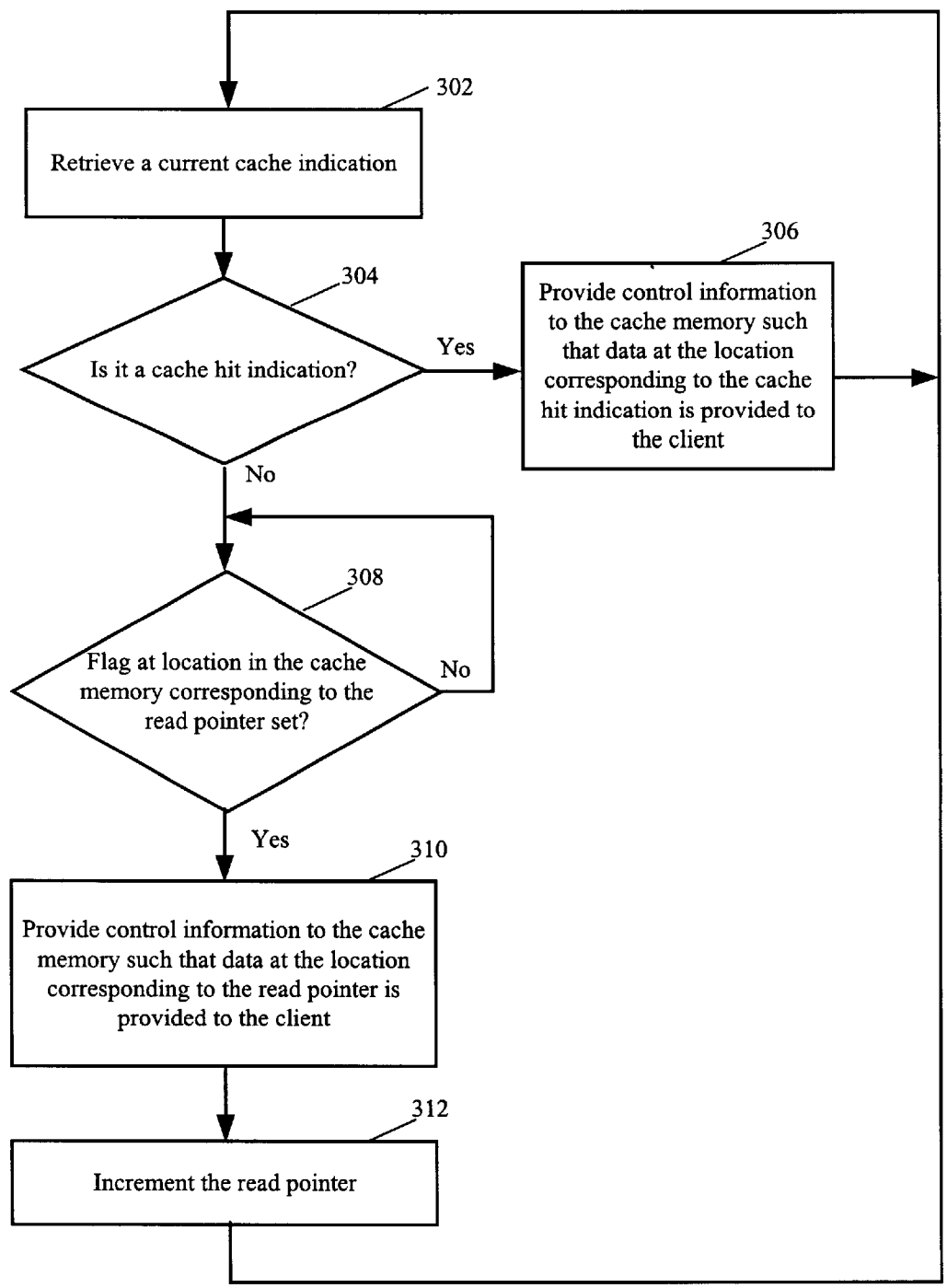
FIG. 13 illustrates a flow diagram of a method for dequeuing read requests by a caching circuit in accordance with a particular embodiment of the present invention.

FIG. 13 illustrates a flow diagram of another portion of a method for controlling memory read operations, where the portion of the method which is illustrated in FIG. 13 may be the portion performed by a cache access controller such as the cache access controller 140 of FIG. 2. The method begins at step 302 where a current cache indication is retrieved from the cache address buffer. Accessing the cache address buffer is preferably performed in an ordered manner such that the oldest cache indication is the current cache indication. Each cache indication retrieved from the cache address buffer is either a buffered cache hit indication or a buffered cache miss indication.

At step 304 it is determined if the current cache indication retrieved at step 302 is a cache hit indication. If it is, the method proceeds to step 306. At step 306, control information is provided to the cache memory such that data at the location corresponding to the cache hit indication is provided to the client. Providing data to the client may include determining if the client is ready to receive the data. Providing the control information for the cache memory at step 306 may include generating the control information from an offset included in the cache hit indication and a read pointer. In other embodiments, the control information is generated strictly from information included in the cache hit indication as stored in the cache address buffer.

If it is determined at step 304 that the current cache indication is not a cache hit indication and therefore a cache miss indication, the method proceeds to step 308. At step 308, the read pointer is examined to determine the entry within the cache memory 170 within which the data corresponding to the cache miss indication should be located. The flag at this location in the cache is then checked to determine if it is set, which, in this particular embodiment would indicate the presence of valid data at that entry. If the flag is not set, the method remains at step 308 until the flag is set. Upon detection of a set flag at the appropriate entry, the method proceeds to step 310.

At step 310, control information is provided to the cache memory such that data stored at the location corresponding to the read pointer is provided to the client. Once again, providing the data to the client may include determining if the client is ready to receive the data. The method then proceeds to step 312 where the read pointer is incremented. Following the completion of steps 312 and 306, the method returns to step 302 where the next cache indication is retrieved from the cache address buffer.

By utilizing the caching circuit and methods described herein, better memory access efficiency can be achieved while ensuring that the ordering of responses to read requests from a client matches the ordering with which the client issued the read requests. The utilization of a small cache memory 170, which may be a circular buffer, limits the additional memory required to perform the buffering and caching operations required to provide such functionality. The cache tag buffer and cache address buffer included in the system are also of limited size, however the sizing of all the buffers and memory included in the caching circuit can be adapted to suit the needs of a particular system or application.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for controlling memory read operations, comprising:

receiving a read request from a client, wherein the read request includes an address;

determining if a tag corresponding to the address is stored in a cache tag buffer;

when a tag corresponding to the address is stored in the cache tag buffer, storing a cache hit indication in a cache address buffer, wherein the cache hit indication provides information as to location of data for the address in a cache memory;

when a tag corresponding to the address is not stored in the cache tag buffer and space is available in the cache memory:

storing a cache miss indication in the cache address buffer;

issuing a memory request using the address, wherein the memory request includes a cache identifier such that data returned in response to the memory request is stored in the cache memory at a location corresponding to the cache identifier, wherein when data is stored in the cache memory at the location corresponding to the cache identifier, a flag associated with the location corresponding to the cache identifier is configured to indicate presence of valid data; and storing at least a portion of the address in the cache tag buffer as a new tag, wherein the new tag replaces an old tag in the cache tag buffer;

accessing the cache address buffer to retrieve a current cache indication, wherein the current cache indication is one of a buffered cache hit indication and a buffered cache miss indication;

when the current cache indication is the buffered cache hit indication, providing control information to the cache memory such that data stored at a location corresponding to the buffered cache hit indication is provided to the client; and when the current cache indication is a buffered cache miss indication and a flag associated with a location corresponding to a read pointer associated with the cache memory indicates that valid data is stored in the location corresponding to the read pointer:

providing control information to the cache memory such that data stored at the location corresponding to the read pointer is provided to the client; and incrementing the read pointer.

2. The method of claim 1, wherein the cache tag buffer stores N tags corresponding to N addresses, wherein N is an integer, wherein storing a cache hit indication further comprises storing a cache hit indication that includes an offset, wherein the offset is used in combination with the read pointer to determine the location in the cache memory corresponding to the buffered cache hit indication.

3. The method of claim 1, wherein the cache tag buffer stores N tags corresponding to N addresses, wherein N is an integer, wherein storing a cache hit indication further comprises storing a cache hit indication that includes a cache memory address, wherein the cache memory address is used to determine the location in the cache memory corresponding to the buffered cache hit indication.

4. The method of claim 1, wherein issuing a memory request further comprises determining the cache identifier based on a write pointer, wherein the write pointer is incremented after issuance of each memory request.

5. The method of claim 4, wherein incrementing the write pointer further comprises comparing the write pointer with the read pointer, wherein when the write pointer reaches a threshold proximity with respect to the read pointer, processing of subsequent read requests that require memory requests is stalled.

6. The method of claim 5, wherein the threshold proximity is equal to the number of tags stored in the cache tag buffer.

7. The method of claim 5, wherein the cache memory is addressed as a circular buffer such that incrementing the read pointer and incrementing the write pointer further comprises incrementing in a circular manner.

8. The method of claim 1, wherein providing data to the client further comprises determining that the client is ready for the data to be provided.

9. The method of claim 1, wherein the cache tag buffer and the cache address buffer are implemented as first in first out (FIFO) buffers.

10. The method of claim 1, wherein issuing a memory request further comprises issuing a memory request over an accelerated graphics port (AGP) bus.

11. A caching circuit, comprising:
a bus adapted for coupling to at least one data storage device;
a read pointer register that stores a read pointer;
a write pointer register that stores a write pointer;
a cache memory that stores cached data, wherein each entry in the cache memory includes a flag that indicates validity of the cached data at that entry;
a cache tag buffer that stores tags corresponding to cached data stored in the cache memory;
a cache address buffer that stores cache hit indications and cache miss indications corresponding to pending read requests;
a memory access controller operably coupled to the cache tag buffer, the cache address buffer, the write pointer register and the bus, wherein the memory access controller receives read requests from a client, wherein each read request includes an address, wherein for each read request:
the memory access controller determines if a tag in the cache tag buffer matches the address for the read request;
when a tag in the cache tag buffer matches the address, the memory access controller stores a cache hit indication in the cache address buffer, wherein the cache hit indication provides information as to location of cached data for the address in the cache memory;
when none of the tags in the cache tag buffer matches the address and there is space available in the cache memory, the memory access controller:
stores a cache miss indication in the cache address buffer;
issues a memory request via the bus using the address, wherein the memory request includes a cache identifier that is based on the write pointer such that data returned in response to the memory request is stored in the cache memory at a location corresponding to the cache identifier, wherein when data is stored in the cache memory as cached data at the location corresponding to the cache identifier, the flag associated with a cache entry at the location is set to indicate valid data;
increments the write pointer; and
stores at least a portion of the address in the cache tag buffer as a new tag, wherein the new tag replaces an old tag in the cache tag buffer; and
a cache access controller operably coupled to the cache memory, the cache address buffer, and the read pointer register, wherein the cache access controller fetches cache hit indications and cache miss indications from the cache address buffer, wherein for each cache hit indication, the cache access controller:
provides control information to the cache memory such that cached data stored at the location corresponding to the cache hit indication is provided to the client; and
wherein for each cache miss indication, the cache access controller:
waits for the flag associated with a cache memory location corresponding to the read pointer to be set, thus indicating valid data at the location in the cache memory corresponding to the read pointer;
provides control information to the cache memory such that cached data stored at the location corresponding to the read pointer is provided to the client; and
increments the read pointer.

12. The caching circuit of claim 11, wherein the cache memory is a circular buffer, and wherein incrementing the read and write pointers further comprises incrementing in a circular manner.

13. The caching circuit of claim 12, wherein the memory access controller is operably coupled to the read pointer register, wherein the memory access controller determines that there is space available in the cache memory by comparing the read pointer with the write pointer.

14. The caching circuit of claim 13, wherein the cache tag buffer is a first in first out is (FIFO) buffer.

15. The caching circuit of claim 14, wherein the cache address buffer is a first in first out (FIFO) buffer.

16. The caching circuit of claim 15 further comprises an accelerated bus port (AGP) interface operably coupled to the memory access controller via the bus, wherein at least a first portion of the memory requests issued by the memory access controller is serviced by the AGP interface.

17. The caching circuit of claim 16 further comprises local memory operably coupled to the memory access controller via the bus, wherein at least a second portion of the memory requests issued by the memory access controller is serviced by the local memory.

18. The caching circuit of claim 15, wherein the cached data includes texture data for a graphics processing system.

19. The caching circuit of claim 15, wherein the cached data includes Z data for a graphics processing system.

20. The caching circuit of claim 15, wherein the caching circuit is included on an integrated circuit.

21. The caching circuit of claim 20, wherein the integrated circuit is included on a video graphics processing circuit for use in a personal computer.

* * * * *